(12) United States Patent
Quast et al.

(10) Patent No.: US 10,489,123 B1
(45) Date of Patent: Nov. 26, 2019

(54) SELECTIVELY ENABLING REQUESTS TO BACKEND EXECUTABLE APPLICATION PROGRAMS FROM A USER INTERFACE IN A MULTI-TIER COMPUTER ARCHITECTURE

(71) Applicant: SAP SE, Walldorf (DE)

(72) Inventors: Torsten Quast, Heidelberg (DE); Manuel Dewald, Edingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/006,326

(22) Filed: Jun. 12, 2018

(51) Int. Cl.
*G06F 9/44* (2018.01)
*G06F 8/34* (2018.01)
*G06F 3/0482* (2013.01)

(52) U.S. Cl.
CPC .............. *G06F 8/34* (2013.01); *G06F 3/0482* (2013.01)

(58) Field of Classification Search
CPC ........................................................ G06F 8/34
See application file for complete search history.

(56) References Cited

U.S. PATENT DOCUMENTS

| | | | |
|---|---|---|---|
| 2005/0177612 A1* | 8/2005 | Duong | G06F 9/485 709/200 |
| 2005/0216486 A1* | 9/2005 | Barshefsky | G06F 8/65 |
| 2012/0137271 A1* | 5/2012 | Kemmler | G06F 8/20 717/120 |
| 2017/0161023 A1* | 6/2017 | Khazanchi | G06F 8/20 |
| 2018/0136988 A1* | 5/2018 | Nandagopal | G06F 9/542 |
| 2019/0138280 A1* | 5/2019 | Ma | G06F 8/34 |

* cited by examiner

*Primary Examiner* — Hang Pan
(74) *Attorney, Agent, or Firm* — Buckley, Maschoff & Talwalkar LLC

(57) ABSTRACT

A method for selectively enabling requests includes There is a first list of in-development backend capabilities and a second list of ready-for-release backend capabilities. There is a third list of in-development middleware capabilities and a fourth list of ready-for-release middleware capabilities. There is a fifth list including backend capabilities which are exposed to a user interface by middleware capabilities, the fifth list being an intersection of the second list and the fourth list. There is a sixth list of development capabilities by taking an intersection of the first list and the third list combined with an intersection of the second list and the third list. Input is accepted from the user interface moving selected development capabilities from the sixth list to the fifth list. Requests from the user interface directed to the backend are selectively enabled to allow only requests directed to backend capabilities of the fifth list of capabilities.

20 Claims, 5 Drawing Sheets

SELECTIVELY ENABLING REQUESTS TO BACKEND EXECUTABLE APPLICATION PROGRAMS FROM A USER INTERFACE IN A MULTI-TIER COMPUTER ARCHITECTURE

FIELD OF THE INVENTION

The disclosed embodiments are directed to selectively enabling requests to backend executable application programs from a user interface development system in a multi-tier computer architecture.

BACKGROUND

Computer systems may use a multi-tier software architecture, which may include, for example, a user interface tier, a middleware tier, and a backend tier. In developing software for such architectures there may be multiple development teams working on features which require cooperation between software in different tiers. Furthermore, such development teams may operate in different countries and time zones. Coding performed for higher level tiers depends on capabilities of lower tiers being exposed. Changes made to capabilities of lower tiers may cause code of higher tiers to fail and/or require additional development to be performed. A product may not be released until the code of all of the tiers interacts successfully.

SUMMARY

In disclosed embodiments, a set of development capabilities in one software tier may be made available for development and testing by other tiers. A development capability may be designated to be a stable capability when it is ready for product release, obviating a separate capability enablement step. In disclosed embodiments, a developer of a tier may add a feature to a list of development capabilities to be automatically communicated to other tiers. A development capability approach may speed up interaction between teams developing different tiers, because they can start developing much earlier and do not have to fear that a feature/capability is being released too early, e.g., by the backend, and will go to production prematurely.

In disclosed embodiments, a feature, i.e., a capability, may be exposed to a user interface (UI) tier by an application program interface (API) provided by a middle tier if a particular capability will be enabled when a user connects to a system. This may include determining whether a backend server designates the capability as being active, available for testing only, or not available at all. Based on this designation, a middleware API may change. Therefore, the UI tier may include components which check at runtime for availability of a particular capability before performing an action.

In disclosed embodiments, the backend tier can inform the middleware tier whether a capability is active or only a development capability. As soon as capability is designated in this manner, e.g., is listed on one of two lists of capabilities, the middleware developers can start programming against it and provide an API to check if the capability is supported or available for testing only. After the middleware has updated, then UI can check a new API provided by middleware to determine whether the backend supports a particular capability. UI components make this determination based on an actual operational server at runtime and enable or disable the capability accordingly In one aspect, the disclosed embodiments provide a method, and corresponding system and processor instructions, for selectively enabling requests to backend executable application programs from a user interface development system. The method includes identifying a state of at least one of a plurality of backend capabilities provided by one or more backend executable application programs stored on at least one backend server. The identified state is one of a set of states comprising: a first state indicating that a backend capability is in development and a second state indicating that a backend capability is ready for release. The method further includes generating a first list of backend capabilities which are identified as being in the in-development state and a second list of backend capabilities which are identified as being in the ready-for-release state. The method further includes generating a third list of middleware capabilities, provided by one or more executable application programs stored on a middleware server, which are identified as being in the in-development state and a fourth list of middleware capabilities which are identified as being in the ready-for-release state. The method further includes generating a fifth list including backend capabilities which are exposed to a user interface, via a network, by at least one of the plurality of middleware capabilities, the fifth list being an intersection of the second list and the fourth list. The method further includes generating a sixth list of capabilities by taking an intersection of the first list and the third list combined with an intersection of the second list and the third list. The method further includes accepting input from the user interface moving selected development capabilities from the sixth list to the fifth list. The method further includes selectively enabling requests from the user interface directed, via the network, to backend executable application programs corresponding to the plurality of backend capabilities to allow only requests directed to backend capabilities of the fifth list of capabilities. The first and second lists, and the third and fourth lists, may be implemented as separate files or combined, in which case the file contains identifiers, e.g., in a field, distinguishing between in-development capabilities and ready-for-release capabilities. In embodiments, the fifth and sixth lists may be combined, in which case the file contains identifiers distinguishing between capabilities which are enabled versus capabilities which are not enabled. Other combinations of the lists are also possible.

Embodiments may include one or more of the following features. The executable application programs stored on the middleware server may include application program interfaces adapted to expose backend capabilities to the user interface. The method may further include developing a first middleware capability to expose a first backend capability which is identified as being in the in-development state and which is included on the first list; and adding the first backend capability to the fifth list. The method may further include developing a first user interface capability to use the first backend capability exposed by the first middleware capability. The method may further include developing a bug fix for the first backend capability, wherein the developing of the bug fix overlaps in time, at least in part, the developing of the first user interface capability. After completing the developing of the first middleware capability and the first user interface capability, the first backend capability may become available as an enabled feature of a user interface upon changing a state of the first backend capability from the in-development state to the ready-for-release state. The method may further include exposing a first backend capability which is identified as being in the in-development state to a first middleware capability of the middleware server. The method may further include exposing the first middleware capability to a first user interface capability.

DETAILED DESCRIPTION

In disclosed embodiments, software built in multiple tiers which can be upgraded independently of one another may provide information defining a common baseline of features supported. This can be achieved using a "capabilities" approach. During development, the developers of each of tier would like to access new features of the other tiers as early as possible, even if they are not considered stable. To achieve this, a "development capabilities" approach can be employed. The development capabilities concept allows easy adoption of features introduced in underlying tiers while they are still in development by adding an additional step in the lifecycle of a capability. In such an approach, before a particular capability is enabled by default in all involved tiers, the lowest tier can introduce it as a development capability. The tiers above can then consume this capability, e.g., by manually activating it in the test/beta code. As soon as the development systems of all tiers agree that the functionality represented by the newly introduced capability is complete, the capability can be declared stable and may be activated by default. During this transition phase, all tiers are still able to develop and execute their code. The development capabilities approach helps ensure that the existing code, when manually enabling development capabilities, will not "break".

Figure 1:
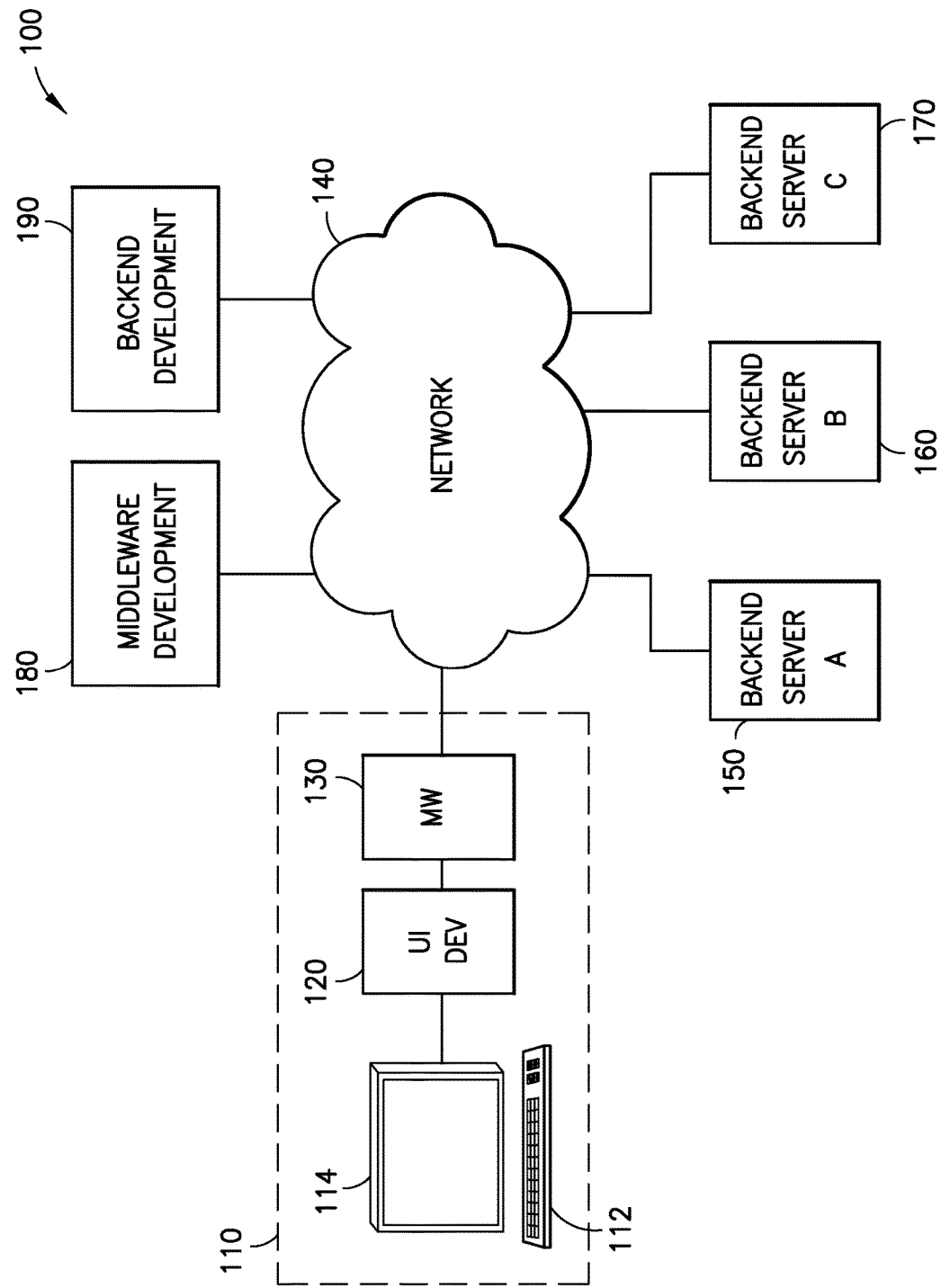
FIG. 1 is a diagram of a system for selectively enabling requests to backend executable application programs from a user interface development system.

FIG. 1 is a diagram of a system 100 for selectively enabling requests to backend executable application programs from a user interface development system. A user device, e.g., a computer system 110, includes input/output devices (e.g., a keyboard 112 and screen 114) which are connected to a user interface (UI) development system 120. The UI development system 120 includes software stored on the computer system 110 and executing on a processor of the computer system 110. Alternatively, or in addition, the UI development system 120 may be implemented using a separate computing device, such as, for example, a network-connected server (not shown). The UI development system 120 is connected to a middleware system 130, which may be implemented using software executing on the processor of the computer system 110 and/or a separate computing device, such as a network-connected server (not shown). The middleware system 130 is, in turn, selectively connected via a network 140 to any one of a number of backend servers, e.g., Backend Server A 150, Backend Server B 160, or Backend Server C 170.

This configuration allows developers to execute and test UI applications and/or capabilities adapted for multi-tier environments. For example, a UI application executed on the UI development system 120 may interact with a middleware application implemented on the middleware system 130 which, in turn, interacts with a backend application on a backend server (150, 160, and 170). The backend server (150, 160, and 170) may be an end user server which has a particular configuration and set of backend applications and capabilities, as opposed to a server which has been set up specifically for use in software development. In this way, the UI applications can be tested in conjunction with conditions which would be encountered in operational systems.

The system 100 may also include a middleware development system 180 and a backend development system 190, both of which are connected via the network 140 to the backend servers (150, 160, and 170) and the UI development system 120. The middleware development system 180 may be, for example, a computer or a computer network. Users of the middleware development system 180 may code middleware applications, features, and/or capabilities and may deploy versions of the middleware to the middleware system 130 of the UI development system 120. Alternatively, UI applications executing on the UI development system 120 may interact with middleware applications executing on the middleware development system 180 for testing purposes. The backend development system 190 may be, for example, a computer or a computer network. Users of the backend development system 190 may code backend applications, features, and/or capabilities and may deploy versions of the backend software to one or more backend servers (150, 160, and 170). Alternatively, UI applications executing on the UI development system 120 may interact with backend applications executing on the backend development system 190 for testing purposes.

Figure 2:
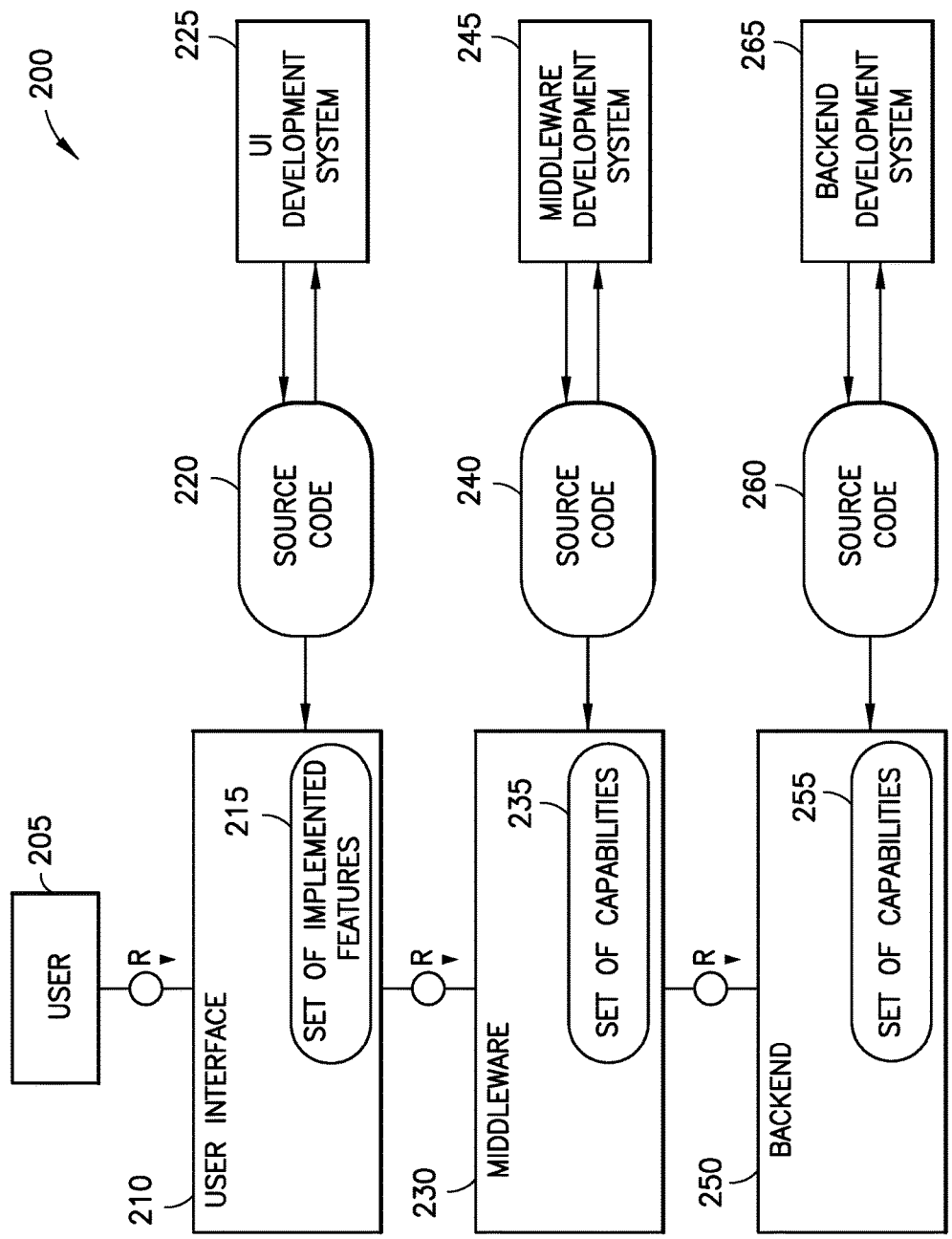
FIG. 2 is a diagram of a multi-tier application development environment.

FIG. 2 is a diagram of a multi-tier application development environment 200 in which UI, middleware, and backend applications are implemented and tested. In this environment, a user 205, e.g., a user interface (UI) developer, interacts with a UI tier 210 having a set of implemented features 215. The UI tier 210 may implement a UI application 220 received, e.g., in the form of source code, from the UI development system 225. The UI application 220, when executed by the UI tier 210, interacts with a middleware tier 230 having a set of middleware capabilities 235. The middleware tier 230 may implement a middleware application 240 received, e.g., in the form of source code, from the middleware development system 245. The middleware application 240, when executed, interacts with a backend tier 250 having a set of backend capabilities 255. The backend tier 250 may implement a backend application 260 received, e.g., in the form of source code, from the backend development system 265.

Figure 3:
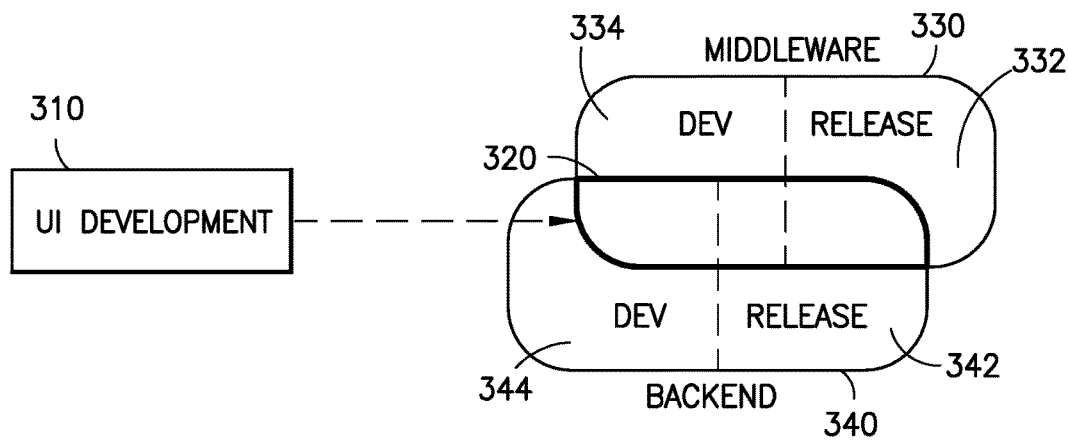
FIG. 3 is a diagram of enabled capabilities for user interface development in a multi-tier application development environment.

FIG. 3 is a diagram of enabled capabilities for user interface development in a multi-tier application development environment. The UI development system 310 implements and tests UI tier applications which depend upon a specific set of enabled capabilities 320 in the lower tiers, i.e., the middleware and backend tiers. The enabled capabilities 320 may be viewed as an intersection of a set of middleware capabilities 330 and a set of backend capabilities 340. In general, these sets of capabilities are runtime dependent, as they arise from specific implementations of middleware and backend applications. In disclosed embodiments, capabilities are disclosed by one tier to another using, e.g., a document which contains a list of strings. The strings include names of capabilities/features which are available on a specific tier. This information may be delivered with, or as part of, the source code.

The set of enabled middleware capabilities 330 includes capabilities which are ready for release 332, which means that the capabilities are available to users as soon as they are included in an implementation in the UI tier. The set of enabled backend capabilities 340 also includes capabilities which are ready for release 342, which means that the capabilities are available to users as soon as they are included in a middleware implementation and a corresponding UI implementation. In disclosed embodiments, the middleware development system and the backend development system may each also have capabilities which are in a "development" status (334 and 344, respectively), which means that the applications underlying these capabilities have not yet been enabled for production release. This status typically arises when newly developed and/or newly updated applications are being tested by the middleware development system and/or the backend development system. In disclosed embodiments, development capabilities may be disabled by default so that they are not inadvertently made available to users prematurely, whereas ready-for-release capabilities are, in effect, enabled by default (i.e., they are available once there are corresponding middleware and backend capabilities in "release" status).

Each tier of an application under development (e.g., backend, middle and user interface) may have its own code base maintained by a set of developers, which may include developers who are working on more than one of the tiers. In disclosed embodiments, the code of the middle tier can make use of features developed in the backend tier as soon as they are developed and released. If this is done, the features can be implemented in the UI layer. The "capabilities" concept allows a tier (e.g., the backend tier) to communicate a set of capabilities, i.e., features, which are implemented in a given version. The consuming tier (e.g., the middle or middleware tier) can react to this information and enable or disable particular features. This approach is especially useful if the tiers are upgraded individually and, for example, the middleware tier needs to assure backwards compatibility to previous versions of the backend tier. The capabilities concept in this example architecture allows the middleware tier and the backend tier to narrate to one another which features are available at runtime. To do this, at application startup, the middleware tier and the backend tier do a "capabilities handshake" to establish which capabilities are supported by the middle tier (i.e., the set of middleware capabilities 330) and the backend tier (i.e., the set of backend capabilities 340). The intersection of these capabilities is the set of enabled capabilities 320 available to the user of the middleware tier, i.e., the source code of the UI tier.

The UI development system does not directly interact with the backends, so it is not directly aware of new capabilities in the backend tier. However, the UI interacts through the middleware with the backend tier. In disclosed embodiments, the backend tier sends a list of supported features/capabilities. The middleware tier similarly has a list of features which it supports. Therefore, the UI development system can, in effect, look for matches between the supported features in both lists, i.e., the backend tier and the middleware tier lists. The UI development system can then determine which features are automatically enabled by middleware and can decide to activate one of the capabilities which is ready for testing. In disclosed embodiments, requests made by the UI development system to capabilities in the backend tier are selectively enabled, e.g., filtered, based on set of enabled capabilities 320. The selective enabling may be done, for example, by activating, or not activating, in the middleware particular capabilities based on the set of enabled capabilities 320. In this way, only requests directed to the enabled capabilities 320 are made by the middleware to the backend. Such selective enabling may also be done by code operating in the middleware tier and/or the backend tier which detects when requests made by the UI development system are directed to capabilities which are not in the set of enabled capabilities 320.

Figure 4:
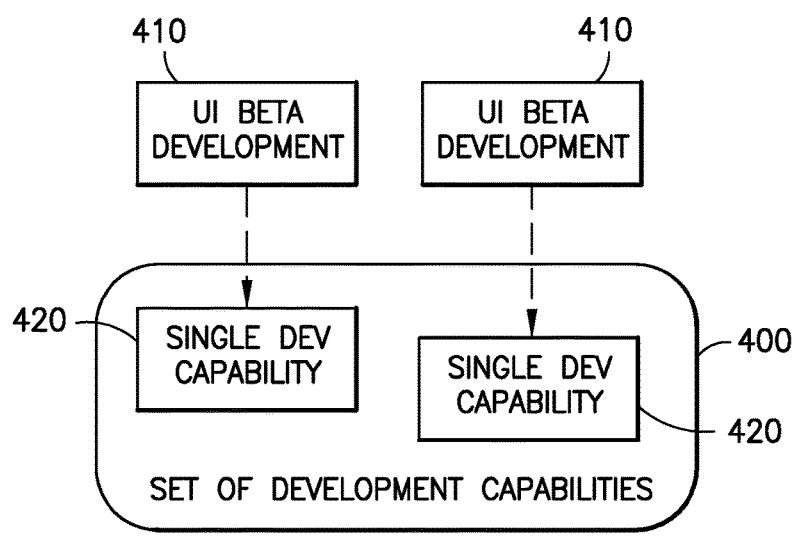
FIG. 4 is a diagram of an environment for exposing a set of development capabilities for user interface beta development.

FIG. 4 is a diagram of an environment for exposing a set of development capabilities 400 for user interface beta development 410. As noted above, in disclosed embodiments, there may be middleware capabilities in development status 334 (see FIG. 3) and backend capabilities in development status 344 (see FIG. 3), which means that the applications underlying these capabilities have not yet been enabled for production release. This status typically arises when newly developed and/or newly updated applications are being tested by the middleware development system and/or the backend development system. In such a case, the UI development system may be authorized to access a set of development capabilities 400 for use in the development of UI applications. For example, UI beta development 410 implementations may be adapted to interact with specific development capabilities 420 which have been made available by the middleware development system and backend development system.

In disclosed embodiments, development capabilities are introduced by providing a second set of capabilities in the backend which have an indication that the capabilities 344 (see FIG. 3) contained in the set are still under development and not for production use. This allows introduction of the capability earlier in the development process to the middleware and the UI tier. Hence, development of new features can be started in all tiers nearly at the same time, resulting in bugs being found earlier. To allow the earlier development, the middleware allows the UI tier to enable single development capabilities by name. In this way, the middleware tier does not need to know about the new capability unless its introduction involves changes in the middleware code base as well.

Figure 5:
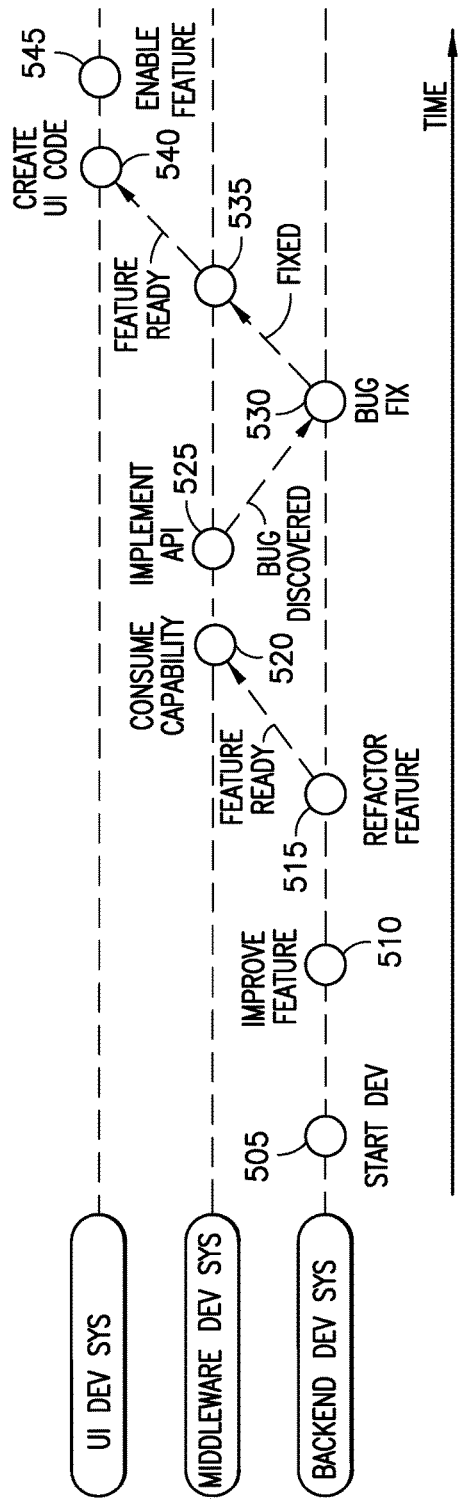
FIG. 5 is a diagram of a process for developing a multi-tier application based on enabled backend and middleware capabilities.

FIG. 5 is a diagram of a process for developing a multi-tier application based on enabled backend and middleware capabilities. Each circle in the diagram represents a change in the particular code base and may be, for example, a release in a continuous integration development setup. In this example, the development in the middleware is started when the backend developers are certain the feature is ready to get consumed. During testing, the middleware development team might discover bugs in the backend code which need to get fixed before the feature can be consumed by the user interface (UI) code. Once the bug is fixed, the middleware might enable the feature, i.e., capability, so that the frontend, i.e., UI, code can consume the new feature.

In disclosed embodiments, the backend development system start development (505) on a feature, i.e., capability, implemented in the form of an application, process, function, etc., in the backend tier. The feature may be improved (510) over course of development and possibly refactored (515), i.e., updated, at which time the feature may be deemed ready for release to other tiers. The feature is consumed (520) by the middleware development system for use in development of an application, application program interface (API), process, function, etc., in the middleware tier. In the course of implementing a middleware API (525) for the backend capability, it is possible that a bug will be discovered, which will necessitate the "return" of the capability (e.g., the un-enabling of the capability and notification of this change in status) to the backend development system for a bug fix to be made (530). Once the bug fix has been made, the "fixed" version of the capability may be enabled for consumption by the middleware development system (535). The middleware development system then finishes development of the middleware tier element, e.g., API, which is adapted to interact with the backend capability and exposes, i.e., enables, the API for use by the UI development system. The UI development system, in turn, creates UI code (540) to implement interaction with the backend capability by the UI tier. Once the UI code is finished, e.g., ready for production release, the feature in question is enabled (545) in the UI application, thereby making the capability accessible by the end user.

Figure 6:
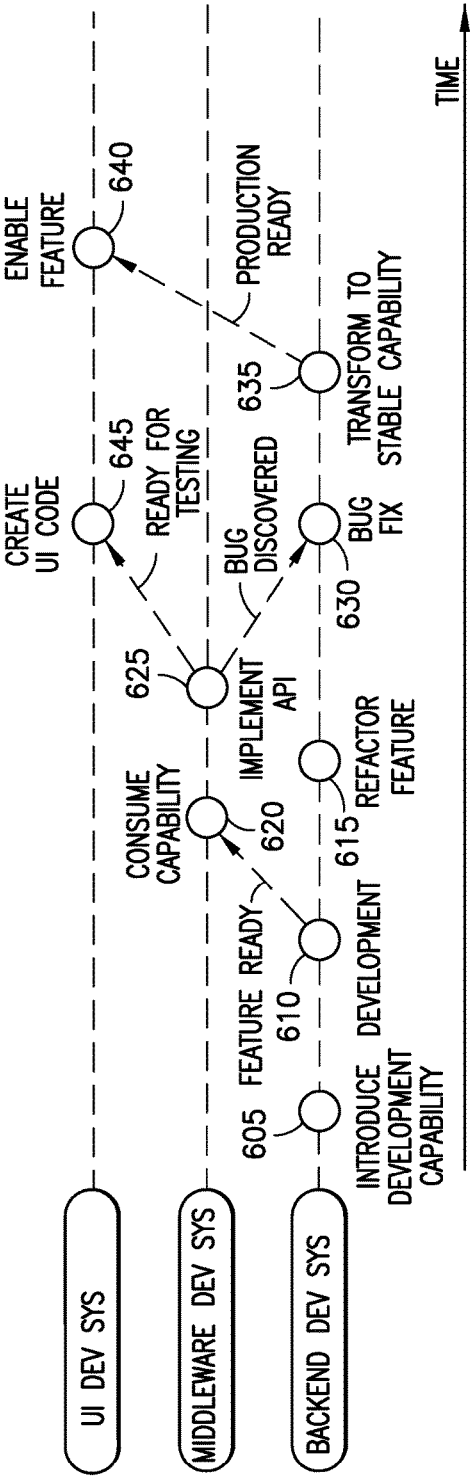
FIG. 6 is a diagram of a process for developing a multi-tier application based on enabled and development backend and middleware capabilities.

FIG. 6 is a diagram of a process for developing a multi-tier application based on enabled and development backend and middleware capabilities. In disclosed embodiments, different software components can communicate with one another, so that a layer below can inform a layer above of the availability of a development capability for testing. This allows development teams of higher tiers, e.g., the user interface (UI) tier, to begin development of features for the UI and allows for earlier detection of bugs. In disclosed embodiments, the development system of a lower tier, e.g., the backend tier, seeks to communicate to the tiers above that a particular feature/capability is available for testing or for production as early as possible in the development process, because a capability need not be finished or entirely free from bugs before higher tiers begin "coding against" the capability.

In disclosed embodiments, the backend development system starts development of a feature (605), i.e., development capability, implemented in the form of an application, process, function, etc., in the backend tier. The feature may be improved over course of development until it is considered ready to be exposed as a development capability (610), i.e., a capability which is still being developed but is sufficiently functional to allow developers in higher tiers to begin developing code making use of the development feature. The development capability may be refactored (615), i.e., updated, but the refactoring does not necessitate another release to other tiers, because the higher tiers already have access to the development capability and can continue "coding against" the development capability without further action by the backend development system.

The development capability is consumed by the middleware development system (620) for use in development of an application, application program interface (API), process, function, etc., in the middleware tier. In the course of implementing a middleware API (625) for the backend capability, it is possible that a bug will be discovered, which will require the backend development system to make a bug fix (630). However, this will not necessitate the "return" of the development capability (e.g., the un-enabling of the development capability and notification of this change in status) to the backend development system. Once the bug fix (630) has been made, the "fixed" version of the development capability is transformed into a stable capability (635), i.e., a capability which is no longer in development, and released as a production ready capability, i.e., an enabled feature (640).

In disclosed embodiments, the capability does not need to be re-released, after the bug fix (630), to the middleware development system before becoming an enabled capability/feature (640) in the UI tier, because the middleware development system has already finished development of the middleware tier element (625), e.g., API, which is adapted to interact with the backend capability. Moreover, the UI development system does not need to wait until the release of the enabled capability (640) before creating UI code (645) to implement interaction with the backend capability by the UI tier. Rather, as depicted in FIG. 6, the UI development (645) can begin after the middleware tier has implemented the API (625), which occurs prior to the bug fix (630) in this example. Thus, the UI code development (645) and the bug fixing (630) at the backend tier can overlap in time. Consequently, in disclosed embodiments, the UI code is already created (645) and ready for production release, when the capability/feature in question is enabled (640), i.e., released by the backend development system as a production-ready capability. It follows, then, that the capability is enabled in the UI application upon production release by the backend development system, thereby making the capability accessible by the end user, without delays introduced by further development in the middleware tier.

In disclosed embodiments, the development capabilities are made available to the complete stack at the same time. For example, if the backend development system provides a new capability for the backend tier, the middle tier will implement it, and it will be automatically exposed to the client, i.e., UI tier. This may occur even if the development is not finalized or the capability is not wanted by every consumer of the client. Alternatively, in disclosed embodiments, the development capabilities may be limited to specific tiers. For example, a development capability produced by the backend development system may be limited to the middleware tier. This will allow development to take place in both the backend and middleware tiers at the same time, without requiring release of the capability to the UI tier until a later time.

Using the development capabilities concept, the feature development can be completed much earlier and backend bugs can be found earlier in the development lifecycle and while developers in the backend team still are focused on the context of the particular feature. Releasing the feature to production includes moving the capability from the development capability set to the stable capability set. Such a transformation will not break any existing beta code in the middleware or UI tier and therefore does not result in changes for the middleware tier. In disclosed embodiments, transformation of a development capability to a stable capability is executed in two steps. First, the backend development system moves the development capability to set of stable capabilities. Then, code manually enabling the development capability is removed. As a practical matter, the client code (e.g., in the UI tier) can remove the manually enablement of the development capability as soon as the backend version is released and available on the system in question. The middleware code is not affected by whether a particular manually-enabled capability exists in the backend as a development capability or a stable production capability. Therefore, the client code will not break when the new capability is made stable—the manually enabling code is superfluous and can be removed safely.

An additional advantage of the development capabilities arises during support of a released version of the backend. By looking at the set of capabilities, one can see if a feature with a defect is already considered to be a stable feature in the backend. If it is contained in the development capabilities set instead of the set of stable capabilities, support personnel can more easily decide if it might be a known defect which is already fixed in a version where the feature is officially supported, i.e., in the set of stable capabilities. In such a case, the support personnel can propose an appropriate upgrade to the backend software.

In disclosed embodiments, when remote debugging sessions are performed on customer systems, it is easier to figure out if a bug fix is included because the backend capability is in one of two states: development or stable capability. This avoids a scenario in which there may be multiple releases of the feature by the backend tier (e.g., after "refactoring" and after a later bug fix) and the support personnel cannot distinguish between these by referring to the capabilities set returned from the backend. Likewise, the middleware development system can more easily determine whether a backend version being used contains a bug fix made at a later stage of development. Development in the middleware can start before the capability is released by the backend, which means that middleware development can begin sooner and can overlap the backend development. Likewise, the UI can consume the newly introduced feature before it is fully supported and enabled by the middleware, which means UI development can begin sooner. Bugs found during the UI development phase are less likely to delay the release of a feature to an end user, and it is easier to discover whether the backend development team has fixed the newly discovered bug.

Figure 7:
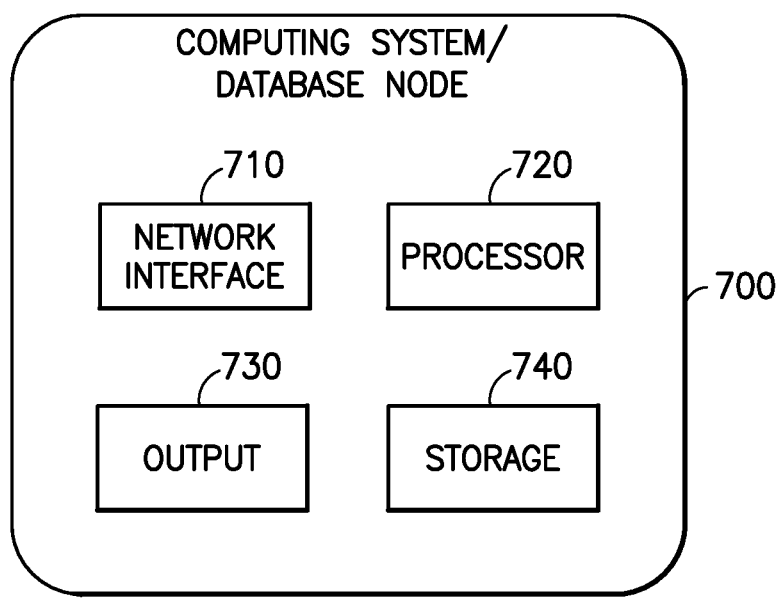
FIG. 7 is a block diagram of a system according to some embodiments.

FIG. 7 is a block diagram of apparatus 700 according to some embodiments. Apparatus 700 may comprise a general-purpose or special-purpose computing apparatus and may execute program code to perform any of the functions described herein. Apparatus 700 may comprise an implementation of one or more elements of system 100. Apparatus 700 may include additional elements which are not shown, according to some embodiments. Apparatus 700 includes processor 720 operatively coupled to communication device 720, data storage device/memory 730, one or more input devices (not shown), and one or more output devices 730. The network interface 710 may facilitate communication with external devices, such as an application server. Input device(s) may be implemented in the apparatus 700 or in a client device connected via the network interface 710. The input device(s) may comprise, for example, a keyboard, a keypad, a mouse or other pointing device, a microphone, knob or a switch, an infra-red (IR) port, a docking station, and/or a touch screen. Input device(s) may be used, for example, to manipulate graphical user interfaces and to input information into apparatus 700. Output device(s) 730 may comprise, for example, a display (e.g., a display screen) a speaker, and/or a printer. Data storage device/memory 740 may comprise any device, including combinations of magnetic storage devices (e.g., magnetic tape, hard disk drives and flash memory), optical storage devices, Read Only Memory (ROM) devices, Random Access Memory (RAM) etc. The storage device 740 stores a program and/or platform logic for controlling the processor 720. The processor 720 performs instructions of the programs and thereby operates in accordance with any of the embodiments described herein, including but not limited to the processes. The programs may be stored in a compressed, uncompiled and/or encrypted format. The programs may furthermore include other program elements, such as an operating system, a database management system, and/or device drivers used by the processor 720 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method for selectively enabling requests to backend executable application programs from a user interface development system in a multi-tier computer architecture, the method comprising:

identifying a state of at least one of a plurality of backend capabilities provided by one or more backend executable application programs stored on at least one backend server, the identified state being one of a set of states comprising: a first state indicating that a backend capability is in development and a second state indicating that a backend capability is ready for release;

generating a first list of backend capabilities which are identified as being in the in-development state and a second list of backend capabilities which are identified as being in the ready-for-release state;

generating a third list of middleware capabilities, provided by one or more executable application programs stored on a middleware server, which are identified as being in the in-development state and a fourth list of middleware capabilities which are identified as being in the ready-for-release state;

generating a fifth list of backend capabilities which are exposed to a user interface, via a network, by at least one of the plurality of middleware capabilities, the fifth list being an intersection of the second list and the fourth list;

generating a sixth list of development capabilities by taking an intersection of the first list and the third list combined with an intersection of the second list and the third list;

accepting input from the user interface moving selected development capabilities from the sixth list to the fifth list; and selectively enabling requests from the user interface directed, via the network, to backend executable application programs corresponding to the plurality of backend capabilities to allow only requests directed to backend capabilities of the fifth list of capabilities.

2. The method of claim 1, wherein the executable application programs stored on the middleware server comprise application program interfaces adapted to expose backend capabilities to the user interface.

3. The method of claim 1, further comprising developing a first middleware capability to expose a first backend capability which is identified as being in the in-development state and which is included on the first list; and adding the first backend capability to the fifth list.

4. The method of claim 3, further comprising developing a first user interface capability to use the first backend capability exposed by the first middleware capability.

5. The method of claim 4, further comprising developing a bug fix for the first backend capability, wherein the developing of the bug fix overlaps in time, at least in part, the developing of the first user interface capability.

6. The method of claim 4, wherein, after completing the developing of the first middleware capability and the first user interface capability, the first backend capability becomes available as an enabled feature of a user interface upon changing a state of the first backend capability from the in-development state to the ready-for-release state.

7. The method of claim 1, further comprising exposing a first backend capability which is identified as being in the in-development state to a first middleware capability of the middleware server.

8. The method of claim 7, further comprising exposing the first middleware capability to a first user interface capability.

9. A system for selectively enabling requests to backend executable application programs from a user interface development system in a multi-tier computer architecture, the system comprising:
a plurality of backend capabilities provided by one or more backend executable application programs stored on at least one backend server, at least one of the plurality of backend capabilities having an identified state, the identified state being one of a set of states comprising: a first state indicating that a backend capability is in development and a second state indicating that a backend capability is ready for release;
a first list of backend capabilities which are identified as being in the in-development state and a second list of backend capabilities which are identified as being in the ready-for-release state;
a third list of middleware capabilities, provided by one or more executable application programs stored on a middleware server, which are identified as being in the in-development state and a fourth list of middleware capabilities which are identified as being in the ready-for-release state;
a fifth list including backend capabilities which are exposed to a user interface, via a network, by at least one of the plurality of middleware capabilities, the fifth list being an intersection of the second list and the fourth list;
a sixth list of development capabilities generated by taking an intersection of the first list and the third list combined with an intersection of the second list and the third list;
accepting input from the user interface moving selected development capabilities from the sixth list to the fifth list; and at least one processor and at least one memory having code to cause the at least one processor to perform selectively enabling requests from the user interface directed, via the network, to backend executable application programs corresponding to the plurality of backend capabilities to allow only requests directed to backend capabilities of the fifth list of capabilities.

10. The system of claim 9, wherein the executable application programs stored on the middleware server comprise application program interfaces adapted to expose backend capabilities to the user interface.

11. The system of claim 9, further comprising a first middleware capability developed to expose a first backend capability which is identified as being in the in-development state and which is included on the first list, wherein the first backend capability is added to the fifth list.

12. The system of claim 11, further comprising a first user interface capability developed to use the first backend capability exposed by the first middleware capability.

13. The system of claim 12, wherein, after completing the developing of the first middleware capability and the first user interface capability, the first backend capability is adapted to become available as an enabled feature of a user interface upon changing a state of the first backend capability from the in-development state to the ready-for-release state.

14. The system of claim 9, further comprising a first backend capability which is identified as being in the in-development state and which is exposed to a first middleware capability of the middleware server.

15. The system of claim 14, wherein the first middleware capability is exposed to a first user interface capability.

16. A non-transitory computer-readable medium storing program instructions executed by at least one processor of a computer system having memory, the medium comprising instructions for causing the at least one processor to perform a method for selectively enabling requests to backend executable application programs from a user interface development system, the method comprising:
identifying a state of at least one of a plurality of backend capabilities provided by one or more backend executable application programs stored on at least one backend server, the identified state being one of a set of states comprising: a first state indicating that a backend capability is in development and a second state indicating that a backend capability is ready for release;
generating a first list of backend capabilities which are identified as being in the in-development state and a second list of backend capabilities which are identified as being in the ready-for-release state;
generating a third list of middleware capabilities, provided by one or more executable application programs stored on a middleware server, which are identified as being in the in-development state and a fourth list of middleware capabilities which are identified as being in the ready-for-release state;
generating a fifth list including backend capabilities which are exposed to a user interface, via a network, by at least one of the plurality of middleware capabilities, the fifth list being an intersection of the second list and the fourth list;
generating a sixth list of development capabilities by taking an intersection of the first list and the third list combined with an intersection of the second list and the third list;

accepting input from the user interface moving selected development capabilities from the sixth list to the fifth list; and selectively enabling requests from the user interface directed, via the network, to backend executable application programs corresponding to the plurality of backend capabilities to allow only requests directed to backend capabilities of the fifth list of capabilities.

17. The computer-readable medium of claim 16, wherein the executable application programs stored on the middleware server comprise application program interfaces adapted to expose backend capabilities to the user interface.

18. The computer-readable medium of claim 16, wherein the method further comprises developing a first middleware capability to expose a first backend capability which is identified as being in the in-development state and which is included on the first list; and adding the first backend capability to the fifth list.

19. The computer-readable medium of claim 16, wherein the method further comprises exposing a first backend capability which is identified as being in the in-development state to a first middleware capability of the middleware server.

20. The computer-readable medium of claim 19, wherein the method further comprises exposing the first middleware capability to a first user interface capability.

* * * * *